United States Patent [19]
Oba

[11] Patent Number: 6,134,498
[45] Date of Patent: Oct. 17, 2000

[54] DRIVE CONTROL SYSTEM FOR A MOTOR VEHICLE

[75] Inventor: Hidehiro Oba, Numazu, Japan

[73] Assignee: Toyota Jidosha Kabushiki Kaisha, Toyota, Japan

[21] Appl. No.: 09/063,393

[22] Filed: Apr. 21, 1998

[30] Foreign Application Priority Data

Apr. 23, 1997 [JP] Japan ................................ 9-105831

[51] Int. Cl.$^7$ ........................................................ B60T 8/32
[52] U.S. Cl. ................................................ 701/84; 701/70
[58] Field of Search ................................ 701/84, 85, 70, 701/48, 54

[56] References Cited

U.S. PATENT DOCUMENTS

| 5,002,148 | 3/1991 | Miyake et al. ........................... 180/197 |
| 5,042,324 | 8/1991 | Suzuki ....................................... 477/47 |
| 5,581,465 | 12/1996 | Adler et al. ............................... 701/110 |

FOREIGN PATENT DOCUMENTS 5-162570  6/1993  Japan .

*Primary Examiner*—Michael J. Zanelli
*Assistant Examiner*—Eric M Gibson
*Attorney, Agent, or Firm*—Oblon, Spivak, McClelland, Maier & Neustadt, P.C.

[57] ABSTRACT

As illustrated in FIG. 2, during the drive of a motor vehicle, the opening degree of a throttle is held at 0% when the manipulated variable of an accelerator is equal to or less than a predetermined value $\alpha$ % near 0%, and the braking force of the vehicle is increased in accordance with the decrement of the manipulated accelerator variable based on $\alpha$ %. Thus, the requests of the driver of the vehicle for a driving force and for the braking force can be exactly detected from the manipulated accelerator variable, whereby the driver's intention is positively and distinctly reflected in the behavior or stability of the vehicle.

3 Claims, 7 Drawing Sheets

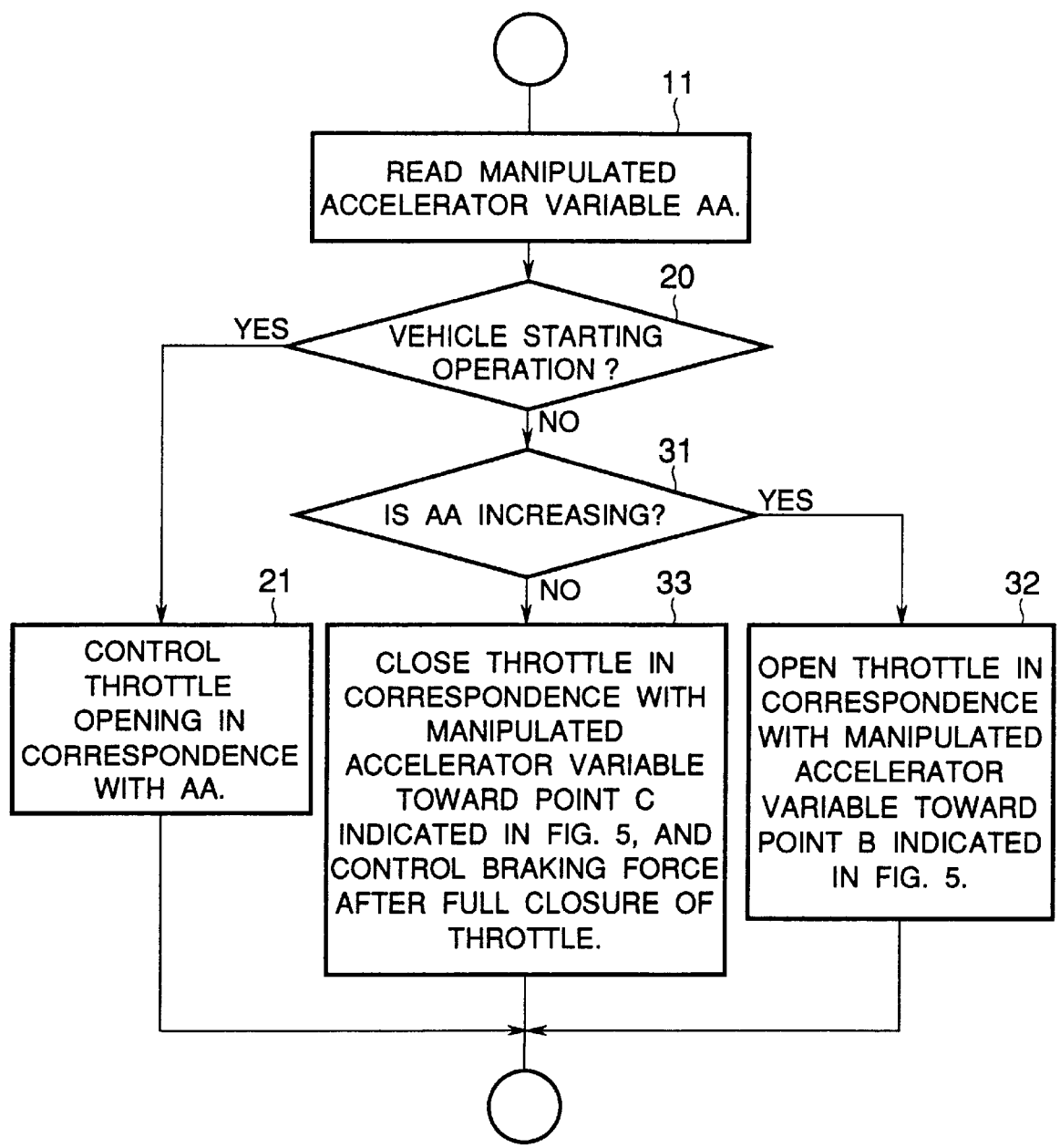

DRIVE CONTROL SYSTEM FOR A MOTOR VEHICLE

BACKGROUND OF THE INVENTION

1. Field of the Invention

The present invention relates to the drive control of a motor vehicle, and more particularly to a drive control system for a motor vehicle in which a braking force is also controllable in accordance with the manipulation or movement of an accelerator pedal.

2. Description of the Prior Art

In general, the accelerator pedal of a motor vehicle is directly connected with the throttle valve of the engine of the vehicle. Accordingly, the control of the manipulated variable (or pressed magnitude) of the accelerator is, or means the very control of the opening (or opening degree) of the throttle. A manipulated accelerator variable (or accelerator stroke) of 0% corresponds to a throttle opening of 0% (full closure). Therefore, a braking force which acts when the accelerator pedal has been released or eased up is based only on engine braking which conforms to a gearshift stage held at that time as it is.

In contrast, a motor vehicle furnished with a throttle valve which is controlled independently of the accelerator pedal is disclosed in, for example, the official gazette of Japanese Patent Application Laid open No. 162570/1993. According to the control of the vehicle, when the accelerator pedal has been released, it is judged that the driver of the vehicle is requesting an engine braking force. Then, when a vehicle speed increases more than at the release of the accelerator pedal under a downslope for example, an automatic transmission is automatically downshifted to increase the engine braking force.

With the prior-art example, the "driving force" of the motor vehicle can be really controlled by the accelerator manipulation. However, the occasion where the manipulated accelerator variable is zero is merely regarded as the occasion where the braking force is required, and it cannot be said that the control is adapted to establish a "braking force" reflecting the driver's request. Naturally, therefore, the braking force is not controlled as the driver's intention by the accelerator manipulation, and it needs to be controlled by pressing a brake pedal separately from the accelerator pedal.

SUMMARY OF THE INVENTION

The present invention has been made in view of the problem of the prior art as stated above, and has for its object to provide a drive control system for a motor vehicle in which the requests of the driver of the vehicle for a driving force and for a (light) braking force are exactly detected from the manipulated variable of an accelerator, whereby the driver's intention is positively and distinctly reflected in the behavior or stability of the vehicle.

As has its purport illustrated in FIG. 1, the present invention accomplishes the above object by a drive control system for a motor vehicle. Concretely, manipulated-accelerator variable detection means 1 detects a manipulated variable of an accelerator, while drive-state detection means 2 detects a drive state of the motor vehicle. Throttle-opening control means 3 controls an opening degree of a throttle of an engine in accordance with the manipulated accelerator variable, while braking-force control means 4 controls a braking force of said motor vehicle. In a situation where said drive-state detection means 2 is detecting that said motor vehicle is in course of drive, when said manipulated accelerator variable detected by said manipulated-accelerator-variable detection means 1 is equal to or less than a predetermined value α % being near 0%, vehicle control means 5 outputs a command for holding the throttle opening degree at 0%, to said throttle-opening control means 3. Simultaneously, said vehicle control means 5 outputs a command for increasing the braking force in accordance with a decrement of said manipulated accelerator variable based on the predetermined value α %, to said braking-force control means 4.

In this manner, the point of the manipulated accelerator variable 0% is not set as an origin for acceleration (deceleration) and braking, but the somewhat pressed magnitude (the predetermined value α %) of the accelerator is set as the origin. Further, above the origin, the throttle opening is controlled in accordance with the manipulated accelerator variable, whereas at and below the origin, the braking force is controlled so as to increase with the decrease of the manipulated accelerator variable. In short, the manipulated accelerator variable equal to or less than α % is used as an index for controlling the braking force, and the manipulated accelerator variable greater than α % is used as an index for controlling the throttle opening.

In a drive control system for a motor vehicle as further defined, said vehicle control means outputs a command for increasing said throttle opening degree from 0% in accordance with an increment of said manipulated accelerator variable based on 0%, to said throttle-opening control means when said manipulated accelerator variable detected by said manipulated-accelerator-variable detection means increases from 0% in a situation where said drive-state detection means is detecting that said motor vehicle is to be started. Thus, the drive control system can avoid the phenomenon that no driving force is generated unless the manipulated accelerator variable exceeds the predetermined value α %. Accordingly, the driver can be freed from a sense of unease in the operation of starting the vehicle.

In a drive control system for a motor vehicle as yet further defined, X-Y coordinates in which an X-axis represents said manipulated accelerator variable, while a Y-axis represents said throttle opening degree, are set in said vehicle control means. On the X-Y coordinates, a point P, a point B, a point C and a point A are set. The point P is set in correspondence with said manipulated accelerator variable of 0% and said throttle opening degree of 0%. The point B is set in correspondence with said manipulated accelerator variable of 100% and said throttle opening degree of 100%. The point C is set in correspondence with said manipulated accelerator variable of 0% and said throttle opening degree of a virtual minus value β%. The point A is set in correspondence with said manipulated accelerator variable of said predetermined value α % near 0% and said throttle opening degree of 0%. With the points thus set, as characteristic lines on said X-Y coordinates in an increase mode for increasing said manipulated accelerator variable, an upper-limit characteristic line in the increase mode which connects the points P and B, a lower-limit characteristic line in the increase mode which connects the points A and B, and a finite number of intermediate characteristic lines in the increase mode which lie between both the upper- and lower-limit characteristic lines and which do not intersect with one another, are set. On the other hand, as characteristic lines on said X-Y coordinates in a decrease mode for decreasing said manipulated accelerator variable, a lower-limit characteristic line in the decrease mode which overlaps the lower-limit characteristic line in the increase mode and which leads to the point C, and a finite number of intermediate characteristic lines in the decrease mode which connect the point C and any coordinate points lying between the upper-limit characteristic line in the increase mode and said lower-limit characteristic line in the increase mode and which do not intersect with one another, are set.

Here, said vehicle control means operates on the basis of the above set data to determine said throttle opening degree. That is, when said manipulated accelerator variable increases in a situation where said manipulated accelerator variable and said throttle opening degree lie at any coordinate point, the throttle opening degree is determined along that characteristic line in the increase mode which contains the coordinate point for starting the increase of said manipulated accelerator variable. When said manipulated accelerator variable decreases from any coordinate point greater than said predetermined value α %, the throttle opening degree is determined along that characteristic line in the decrease mode which contains the coordinate point for starting the decrease of said manipulated accelerator variable. And, when said manipulated accelerator variable has decreased to said predetermined value α %, thereafter, the throttle opening degree is determined to 0%.

Besides, a virtual minus throttle opening degree in which an absolute value enlarges with the decrement from said predetermined value α % when said manipulated accelerator variable has decreased to said predetermined value α %, is set in said vehicle control means. Here, said vehicle control means operates on the basis of the above set data to issue a command for enlarging said braking force with the absolute value of the virtual minus throttle opening degree.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein:

FIG. 8 is a flow chart showing a control in the third aspect of performance of the present invention.

DETAILED DESCRIPTION OF THE PREFERRED EMBODIMENTS

Now, the aspects of performance of the present invention will be described with reference to the drawings.

In a drive control system for a motor vehicle in each of the aspects of performance, an accelerator pedal and a throttle valve (throttle-opening control means) are not in mechanical direct connection, the throttle valve mounted is one of electronic type which can be controlled independently of the accelerator pedal. A control unit (vehicle control means) controls the throttle valve in accordance with the signal of a sensor for detecting the manipulated variable or pressed magnitude of the accelerator pedal, etc.

Braking-force control means for use in the drive control system needs must be capable of regulating a braking force linearly (or in stepless fashion). In case of a motor vehicle on which a stepless transmission such as CVT (continuously variable transmission) is installed, engine braking can be generated by regulating a change gear ratio. On this occasion, an engine braking force can be linearly enlarged by shifting the change gear ratio to an increasing side (reduction side).

In case of a stepped transmission, it is unsuitable to use the engine braking of each gearshift stage directly as braking for performing the present invention, so that braking means of active type separately installed is utilized. Further, in case of an electric automobile, an electric motor may be braked, so that the drive system of the automobile can be directly utilized as the braking-force control means.

The control unit issues control commands to the throttle valve and the braking-force control means in accordance with the signal of the manipulated-accelerator-variable sensor, the signal of a vehicle speed sensor corresponding to drive-state detection means, etc., thereby to control the behavior or stability of the motor vehicle as intended by the driver thereof.

The contents of a control in the system of the first aspect of performance will be explained in detail below.

Figure 1:
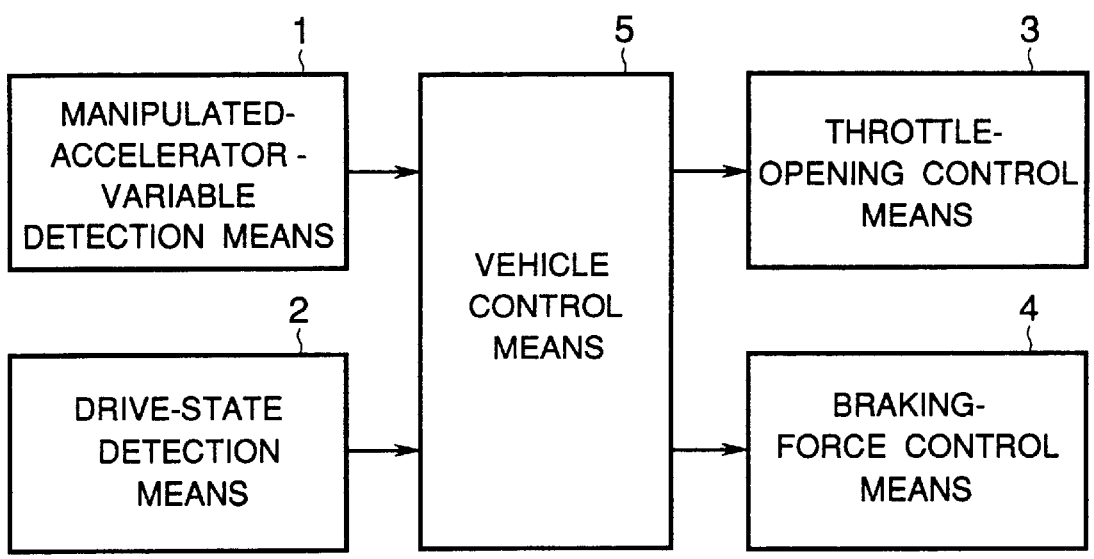
FIG. 1 is a block diagram showing the purport of the present invention.
Figure 2:
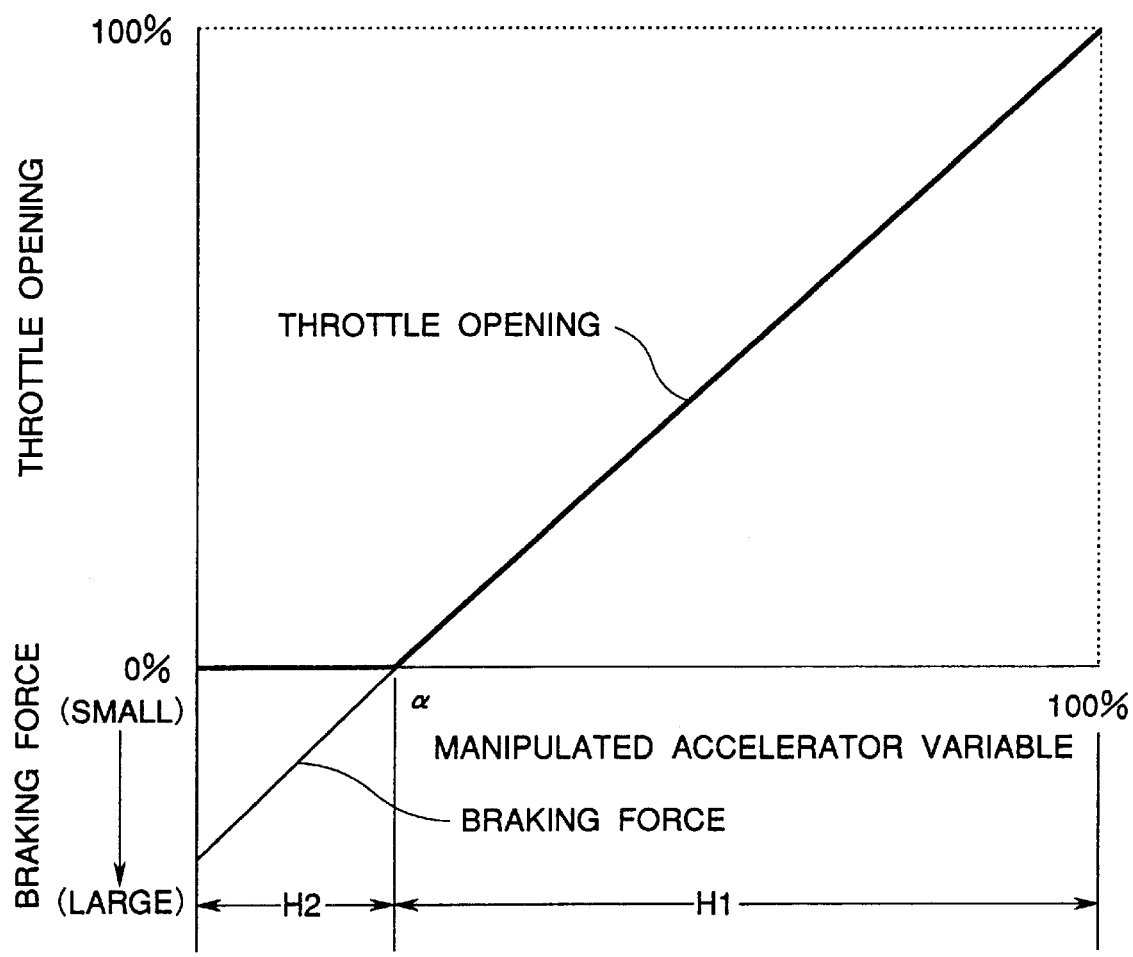
FIG. 2 is a graph showing an operating characteristic in the first aspect of performance of the present invention.
Figure 3:
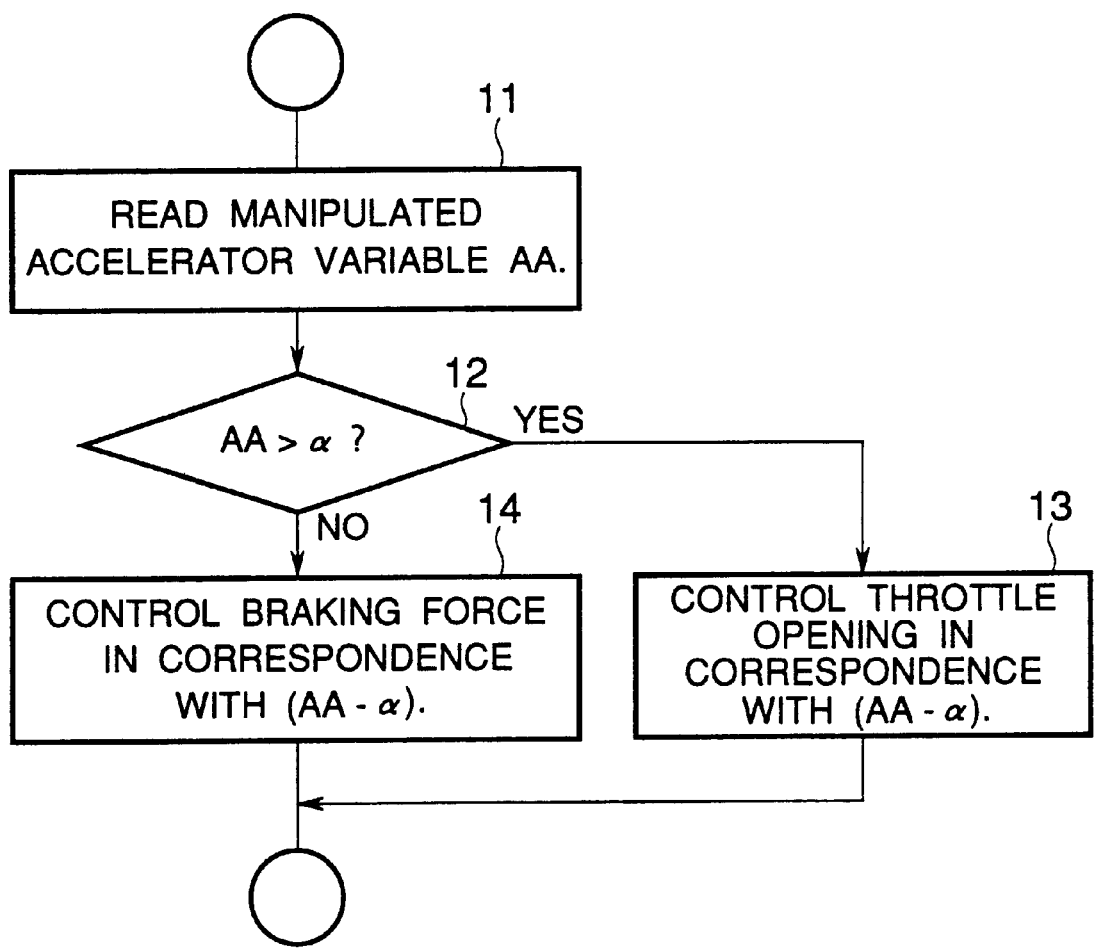
FIG. 3 is a flow chart showing a control in the first aspect of performance of the present invention.

FIG. 2 is a graph showing a control characteristic in the system of the first aspect of performance, while FIG. 3 is a flow chart of the control.

In this aspect of performance, as illustrated in FIG. 2, the throttle opening (the opening degree of the throttle valve) is held at 0% when the manipulated accelerator-variable (the manipulated variable of the accelerator pedal) has decreased to a predetermined value α % (near 0%) in the drive state of the vehicle (in a situation where the motor vehicle is in course of drive). Subsequently, the braking force of the vehicle is enlarged in accordance with the decrement of the manipulated accelerator variable based on the predetermined value α %. That is, the manipulated accelerator variable is used as the index of the throttle opening in a region H1 where the manipulated accelerator variable is greater than α %, while the manipulated accelerator variable is used as the index of the braking force in a region H2 where the manipulated accelerator variable is equal to or less than α %.

The flow of the control of the control unit is as illustrated in FIG. 3. When the manipulated accelerator variable AA detected by the sensor has been read (step 11), whether or not the read value AA is greater than the predetermined value α % is judged (step 12). On condition that the manipulated accelerator variable AA is greater than the value α %, the throttle opening is controlled in correspondence with a difference (AA−a) obtained by subtracting the value a from the value AA (step 13). In contrast, on condition that the manipulated accelerator variable AA is not greater than the value α %, in other words, that the former is equal to or less than the latter, the braking force is controlled in correspondence with the difference (AA−a) obtained by subtracting the value a from the value AA (step 14).

In the case of the above aspect of performance, in the operation of starting the motor vehicle, there arises the phenomenon that, in spite of the increase of the manipulated accelerator variable from 0%, the throttle opening is held at 0% unless the manipulated accelerator variable exceeds α

%, so the driving force of the vehicle is not generated. Then, a kind of sense of unease might be given to the driver in the vehicle starting operation.

Figure 4:
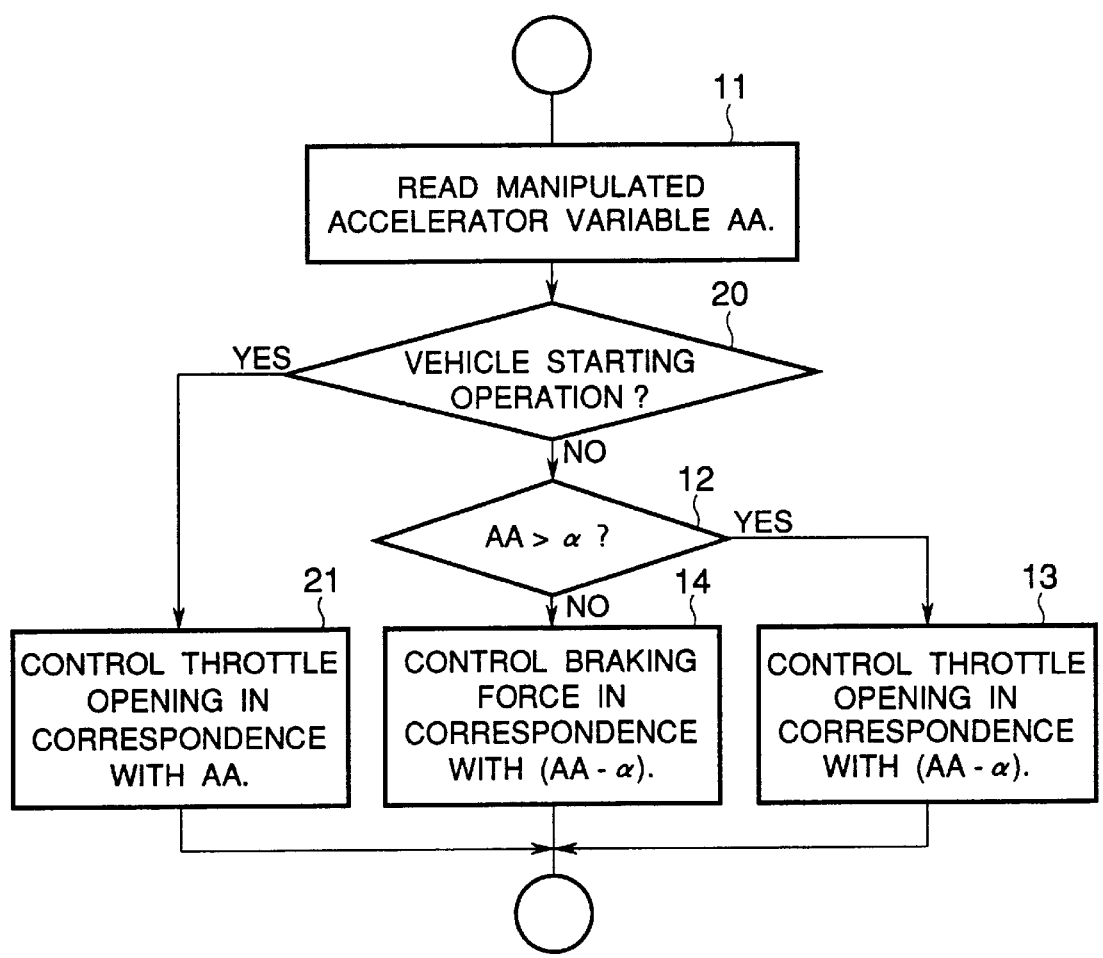
FIG. 4 is a flow chart showing a control in the second aspect of performance of the present invention.

In the second aspect of performance, therefore, in the case where the manipulated accelerator variable increases from 0% in the vehicle starting operation, the throttle opening is increased from 0% in accordance with the increment of the manipulated accelerator variable. FIG. 4 illustrates the flow of the control in that case.

The difference of the control flow from the example of FIG. 3 is that the processing of a step 20 as well as a step 21 is added. When the manipulated accelerator variable AA has been read at the step 11, if the motor vehicle is to be started is judged at the step 20. In the case of the vehicle starting operation, the control flow advances to the step 21, at which the throttle opening is controlled in correspondence with the manipulated accelerator variable AA.

With such a control, as soon as the accelerator pedal is pressed, the throttle opening rises, so that the kind of sense of unease can be eliminated in the vehicle starting operation. However, since discrepancy is involved between the characteristic of the throttle opening in the increase mode for increasing the manipulated accelerator variable and the characteristic thereof in the decrease mode, the control might fail to smoothly proceed without any further contrivance.

Therefore, the third aspect of performance to be described below consists in an example in which the control can be executed smoothly.

Figure 5:
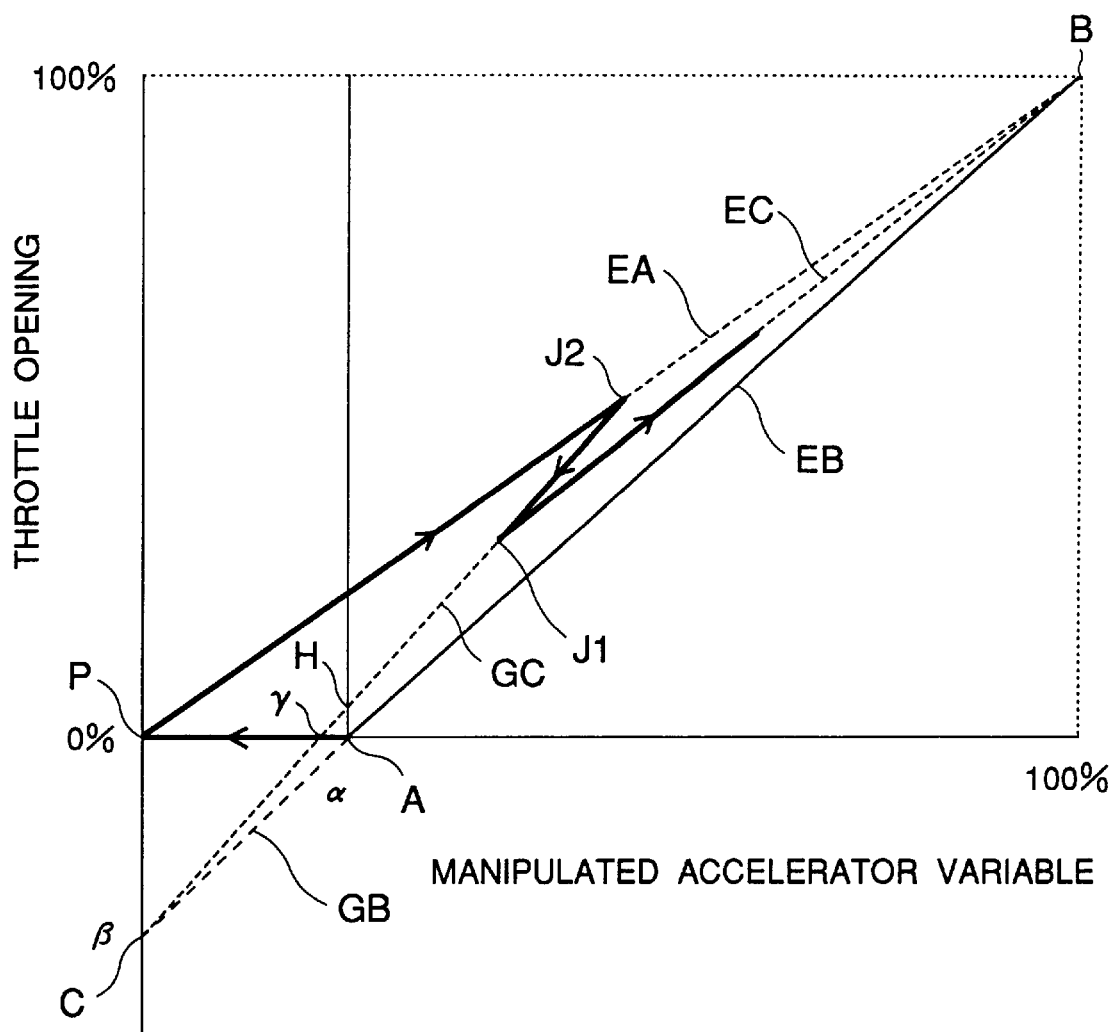
FIG. 5 is a graph showing operating characteristics in the third aspect of performance of the present invention.
Figure 6:
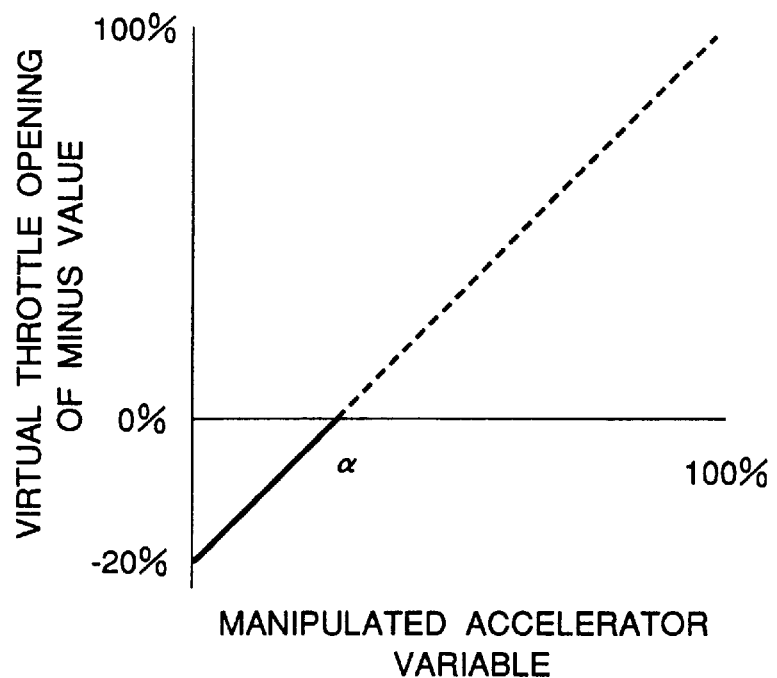
FIGS. 6 and 7 are graphs for explaining the operating characteristics in the third aspect of performance of the present invention.
Figure 7:
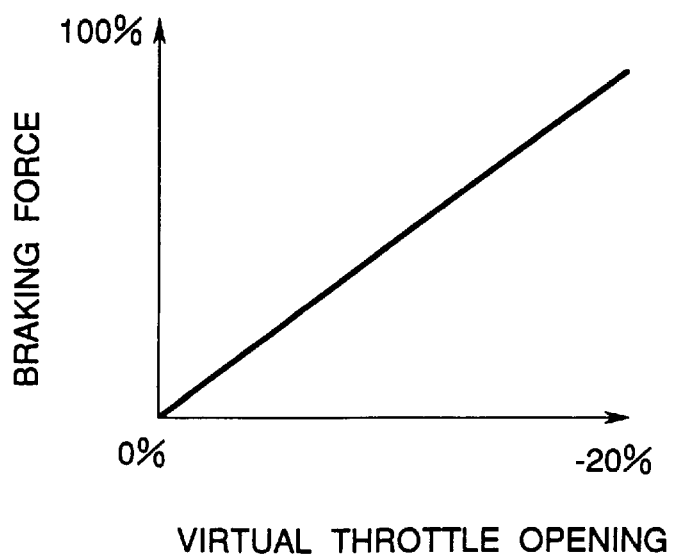

FIG. 5 is a graph of characteristics showing the relationships between the manipulated accelerator variable and the throttle opening in the third aspect of performance, FIG. 6 is a graph of a characteristic showing the relationship between the manipulated accelerator variable and a virtual minus throttle opening which is utilized as the parameter of a braking force control, and FIG. 7 is a graph of a characteristic showing the relationship between the virtual minus throttle opening and the braking force.

In the third aspect of performance, as illustrated in FIG. 5, X-Y coordinates in which an X-axis represents the manipulated accelerator variable, while a Y-axis represents the throttle opening, are virtually set in the control unit beforehand. On the X-Y coordinates, a point P is set in correspondence with the manipulated accelerator variable of 0% and the throttle opening of 0%, a point B in correspondence with the manipulated accelerator variable of 100% and the throttle opening of 100%, a point C in correspondence with the manipulated accelerator variable of 0% and the throttle opening of a virtual minus value $\beta$ %, and a point A in correspondence with the manipulated accelerator variable of the predetermined value $\alpha$ % (near 0%) and the throttle opening of 0%. With the points thus set, as characteristic lines on the X-Y coordinates in the increase mode for increasing the manipulated accelerator variable, an upper-limit characteristic line EA in the increase mode which connects the points P and B, a lower-limit characteristic line BB in the increase mode which connects the points A and B, and a finite number of intermediate characteristic lines EC in the increase mode which lie between both the upper- and lower-limit characteristic lines EA, EB and as do not intersect with one another, are set. On the other hand, as characteristic lines on the X-Y coordinates in the decrease mode for decreasing the manipulated accelerator variable, a lower-limit characteristic line GB in the decrease mode which overlaps the lower-limit characteristic line EB in the increase mode and which leads to the point C, and a finite number of intermediate characteristic lines GC in the decrease mode which connect the point C and any coordinate points lying between the upper-limit characteristic line EA in the increase mode and the lower-limit characteristic line EB in the increase mode and which do not intersect with one another, are set.

When the manipulated accelerator variable increase s in a situation where the manipulated accelerator variable and the throttle opening lie at any coordinate point, the control unit operates on the basis of the above set data to determine the throttle opening along the characteristic line (EC in the illustrated example) in the increase mode which contains the coordinate point (J1 in the illustrated example) for starting the increase of the manipulated accelerator variable. Besides, when the manipulated accelerator variable decreases from any coordinate point greater than the predetermined value $\alpha$ %, the control unit operates to determine the throttle opening along the characteristic line (GC in the illustrated example) in the decrease mode which contains the coordinate point (J2 in the illustrated example) for starting the decrease of the manipulated accelerator variable. That is, the throttle opening is determined toward the point B in the increase mode, and determined toward the point C in the decrease mode. Further, when the manipulated accelerator variable has decreased to the predetermined value $\alpha$ %, thereafter, the control unit operates to determine the throttle opening to 0% in the same manner as in each of the foregoing aspects of performance. The control unit gives the throttle valve a control command conforming to the determined content, thereby to control the throttle valve.

On the other hand, regarding the control of the braking force, the virtual minus throttle opening is set as the new parameter. More specifically, the characteristic of the relationship between the manipulated accelerator variable and the virtual minus throttle opening as shown in FIG. 6 is registered in the control unit. The virtual minus throttle opening is so set that the absolute value thereof enlarges with the decrement of the manipulated accelerator variable based on the predetermined value $\alpha$ %, after the manipulated accelerator variable became the predetermined value $\alpha$ %. Thus, the control unit issues a command for enlarging the braking force with the absolute value of the virtual minus throttle opening, in accordance with the graph shown in FIG. 7.

FIG. 8 is a flow chart showing the control in this aspect of performance. When the manipulated accelerator variable AA has been read at the step 11, if the motor vehicle is to be started is judged at the step 20. In the case of the vehicle starting operation, the flow of the control advances to the step 21, at which the throttle opening is controlled in correspondence with the manipulated accelerator variable AA. That is, the throttle opening is determined along the upper-limit characteristic line EA in the increase mode as indicated in FIG. 5.

In a case where the vehicle is not to be started, the control flow advances to a step 31, which serves to judge whether or not the manipulated accelerator variable AA is increasing. Subject to the increase of the variable AA, the control flow advances to a step 32, at which the throttle opening is controlled in correspondence with the manipulated accelerator variable toward the point B indicated in FIG. 5. That is, the throttle opening is controlled along the intermediate characteristic line EC in the increase mode. On the other hand, subject to the decrease of the manipulated accelerator variable AA, the control flow advances to a step 33, at which the throttle opening is controlled in correspondence with the manipulated accelerator variable toward the point C indicated in FIG. 5. Further, when the manipulated accelerator variable has lowered to α % at a point H, or, when the real throttle opening has lowered to 0% at a point γ, thereafter, the throttle opening is fixed to 0%. At the same time, the virtual minus throttle opening is determined from the characteristic of FIG. 6 in correspondence with the manipulated accelerator variable, and the braking force is controlled according to the characteristic of FIG. 7 in correspondence with the virtual minus throttle opening. Consequently, as the manipulated accelerator variable decreases more from α %, the braking force of larger magnitude can be worked.

As described above, according to the present invention, when the manipulated variable or pressed magnitude of an accelerator pedal has decreased near 0%, a larger braking force can be worked in correspondence with the degree of the decrease. That is, a braking force can be controlled to some extent merely by the manipulation of the accelerator pedal without manipulating or pressing a brake pedal, so that a driver's intention can be reflected in the behavior or stability of a motor vehicle more positively and more distinctly.

What is claimed is:

1. A drive control system for a motor vehicle which has an accelerator pedal for accelerating the motor vehicle, a throttle control means for controlling an engine in accordance with the throttle opening degree thereof, a braking force control unit for controlling a braking force of said motor vehicle, comprising:

manipulated-accelerator-variable detection means for detecting a manipulated variable of said accelerator pedal;

drive-state detection means for detecting a drive state of said motor vehicle; and vehicle control means for outputting a command for holding said throttle opening degree at 0%, to said throttle control means when said manipulated accelerator variable detected by said manipulated-accelerator-variable detection means is equal to or less than a predetermined value α % being near 0%, in a situation where said drive state detection means is detecting that said motor vehicle is in course of drive, and for outputting a command for increasing the braking force in accordance with a decrement of said manipulated accelerator variable based on the predetermined value α %, to said braking force control unit, wherein said vehicle control means outputs a command for increasing said throttle opening degree from 0% in accordance with an increment of said manipulated accelerator variable based on 0%, to said throttle control means when said manipulated accelerator variable detected by said manipulated-accelerator-variable detection means increases from 0% in a situation where said drive-state detection means is detecting that said motor vehicle is to be started.

2. A drive control system for a motor vehicle as defined in claim 1, wherein in said vehicle control means, X-Y coordinates are set in which an X-axis represents said manipulated accelerator variable, while a Y-axis represents said throttle opening degree;

an upper-limit characteristic line in an increase mode for increasing said manipulated accelerator variable which connects a point P corresponding to said manipulated accelerator variable of 0% and said throttle opening degree of 0% on the X-Y coordinates and a point B corresponding to said manipulated accelerator variable of 100% and said throttle opening degree of 100%, a lower-limit characteristic line in the increase mode which connects said point B and a point A corresponding to said manipulated accelerator variable of said predetermined value α % and said throttle opening degree of 0%, and a finite number of intermediate characteristic lines in the increase mode which lie between both the upper- and lower-limit characteristic lines and which do not intersect with one another, are set, as characteristic lines on said X-Y coordinates in the increase mode; and a lower-limit characteristic line in a decrease mode for decreasing said manipulated accelerator variable which overlaps said lower-limit characteristic line in the increase mode and leads to a point C corresponding to said manipulated accelerator variable of 0% and said throttle opening degree of a virtual minus value β %, and a finite number of intermediate characteristic lines in the decrease mode which connect said point C and any coordinate points lying between said upper-limit characteristic line in the increase mode and said lower limit characteristic line in the increase mode and do not intersect with one another, are set, as characteristic lines on said X-Y coordinates in the decrease mode; and data of virtual minus throttle opening degree are set in which an absolute value enlarges with the decrement from said predetermined value α % when said manipulated accelerator variable is equal to or less than said predetermined value α %; and on the basis of the above set data, said vehicle control means operates;

to determine said throttle opening degree along that characteristic line in the increase mode which contains the coordinate point for starting the increase of said manipulated accelerator variable when said manipulated accelerator variable increases, in a situation where said manipulated accelerator variable and said throttle opening degree lie at any coordinate point;

to determine said throttle opening degree along that characteristic line in the decrease mode which contains the coordinate point for starting the decrease of said manipulated accelerator variable when said manipulated accelerator variable decreases from any coordinate point greater than said predetermined value α %; and to determine said throttle opening degree to 0%, and to issue a command for enlarging said braking force with the absolute value of said virtual minus throttle opening degree to said braking force control means, when said manipulated accelerator variable is equal to or less than said predetermined value α %.

3. A drive control system for a motor vehicle as defined in claim 2, wherein in a situation where the intermediate characteristic line in the decrease mode now employed intersects with said X-axis at a point γ % being less than α %, said vehicle control means operates to determine said throttle opening degree to 0% after said manipulated accelerator variable became γ % being less than said value α %.

* * * * *